US010630402B2

(12) United States Patent
Gresset

(10) Patent No.: US 10,630,402 B2
(45) Date of Patent: Apr. 21, 2020

(54) SYSTEM AND METHOD FOR QUANTIZING INTERFERENCE PROFILE

(71) Applicant: MITSUBISHI ELECTRIC CORPORATION, Tokyo (JP)

(72) Inventor: Nicolas Gresset, Rennes (FR)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 83 days.

(21) Appl. No.: 15/778,777

(22) PCT Filed: Dec. 27, 2016

(86) PCT No.: PCT/JP2016/089233
§ 371 (c)(1),
(2) Date: May 24, 2018

(87) PCT Pub. No.: WO2017/122549
PCT Pub. Date: Jul. 20, 2017

(65) Prior Publication Data
US 2018/0359037 A1    Dec. 13, 2018

(30) Foreign Application Priority Data
Jan. 13, 2016 (EP) .................................. 16151136

(51) Int. Cl.
*H04L 12/801* (2013.01)
*H04L 5/14* (2006.01)
(Continued)

(52) U.S. Cl.
CPC ........... *H04B 17/26* (2015.01); *H04B 17/345* (2015.01); *H04L 27/0006* (2013.01); *H04W 4/029* (2018.02)

(58) Field of Classification Search
CPC .... H04B 17/26; H04B 17/345; H04B 17/309; H04B 17/373; H04B 17/401; H04W 4/029; H04W 4/04; H04W 4/18; H04W 4/42
See application file for complete search history.

(56) References Cited

U.S. PATENT DOCUMENTS 9,992,778 B2 * 6/2018 Brunel ................ H04W 72/048
10,338,939 B2 * 7/2019 Franck .................. G06Q 50/01
(Continued)

FOREIGN PATENT DOCUMENTS

EP    2 688 351 A1    1/2014
EP    2 866 509 A1    4/2015

*Primary Examiner* — Faruk Hamza
*Assistant Examiner* — Abusayeed M Haque
(74) *Attorney, Agent, or Firm* — Birch, Stewart, Kolasch & Birch, LLP

(57) ABSTRACT

The present invention concerns a method for quantizing an interference profile for a wireless telecommunication system along a path that a moving device takes. The method comprises the steps of: obtaining, by a server, the location of the moving device along the path which corresponds to a measurement window, determining by using the location of the moving device, by the server, a format of feedback information, transferring to the moving device, a message comprising information related to the determined format, obtaining during the measurement window, measurements related to interference, processing the measurements in order to obtain feedback information in the format, transferring feedback information to the server, converting the feedback information in a format of a database related to interference profile, updating the database with the converted feedback information.

10 Claims, 6 Drawing Sheets

(51) Int. Cl.

| | |
|---|---|
| *H04L 29/08* | (2006.01) |
| *H04L 12/28* | (2006.01) |
| *H04B 17/26* | (2015.01) |
| *H04B 17/345* | (2015.01) |
| *H04L 27/00* | (2006.01) |
| *H04W 4/029* | (2018.01) |

(56) References Cited

U.S. PATENT DOCUMENTS

| | | | | |
|---|---|---|---|---|
| 2011/0150004 | A1* | 6/2011 | Denteneer | H04B 7/0452 370/476 |
| 2013/0315192 | A1* | 11/2013 | Seo | H04W 72/1231 370/329 |
| 2014/0098695 | A1* | 4/2014 | Jeong | H04B 7/0617 370/252 |
| 2015/0032366 | A1* | 1/2015 | Man | G08G 1/096741 701/412 |
| 2015/0188662 | A1* | 7/2015 | Shapira | H04K 3/825 455/1 |
| 2016/0150432 | A1* | 5/2016 | Qin | H04W 24/10 370/252 |
| 2016/0233971 | A1* | 8/2016 | Fink | H01Q 3/44 |

* cited by examiner

[Fig. 1]
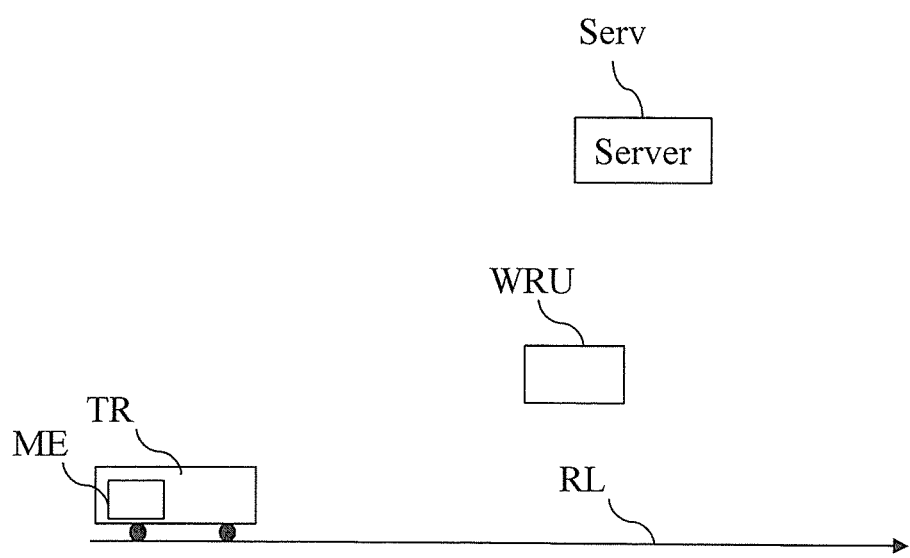

[Fig. 2]
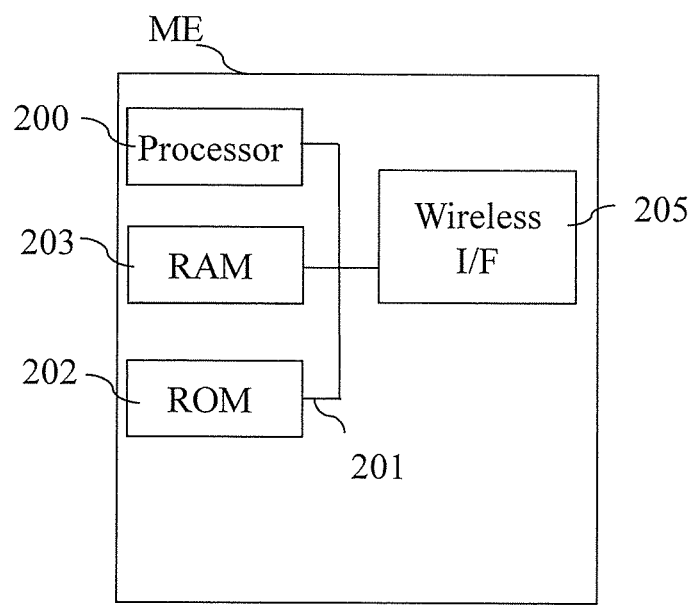
[Fig. 3]
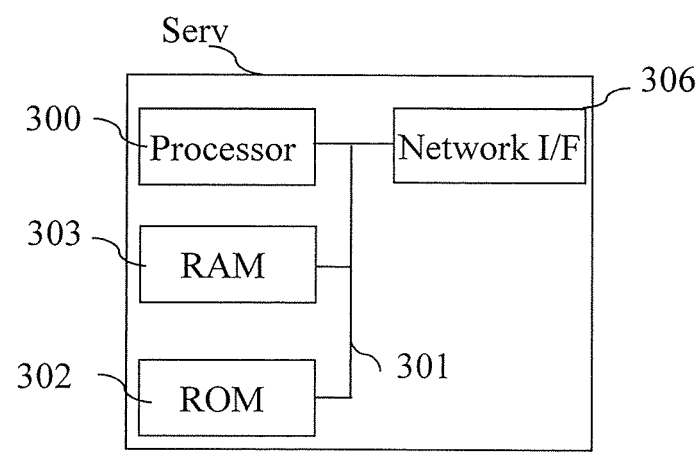

[Fig. 4]
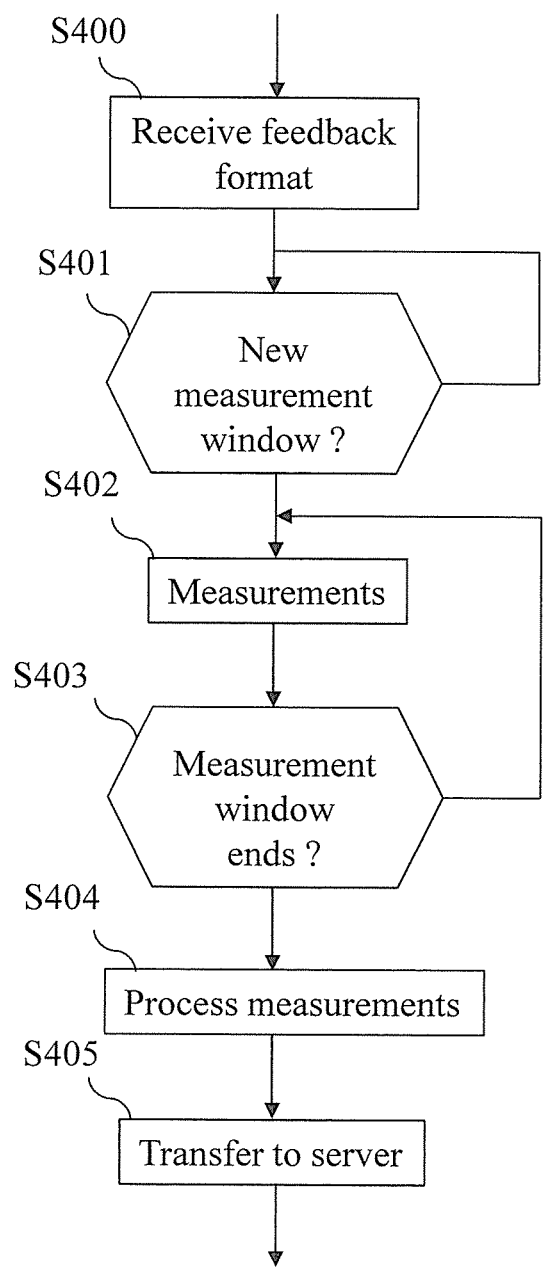

[Fig. 5]
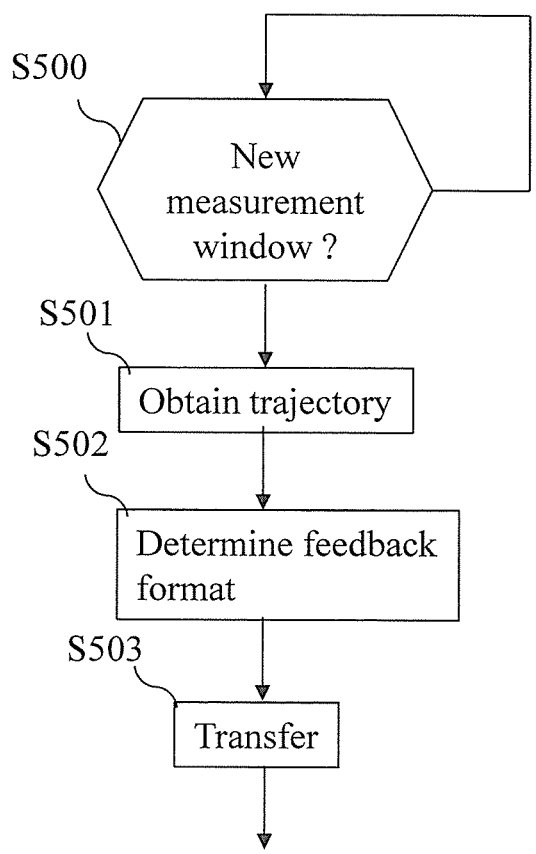

[Fig. 6a]
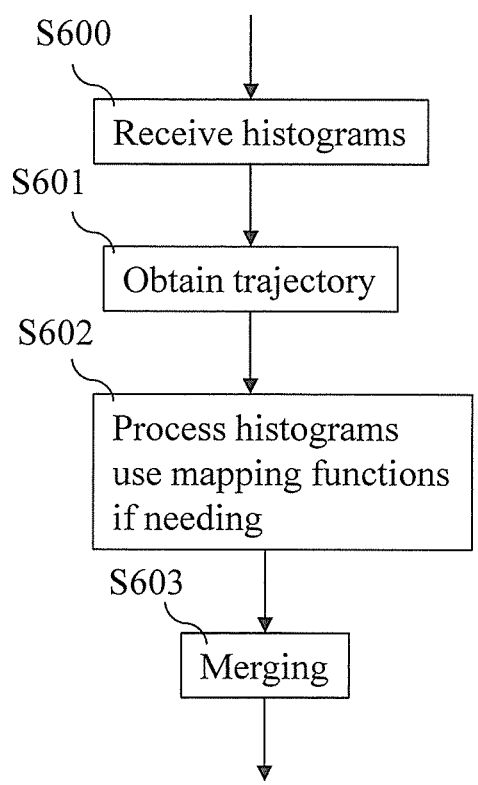

[Fig. 6b]
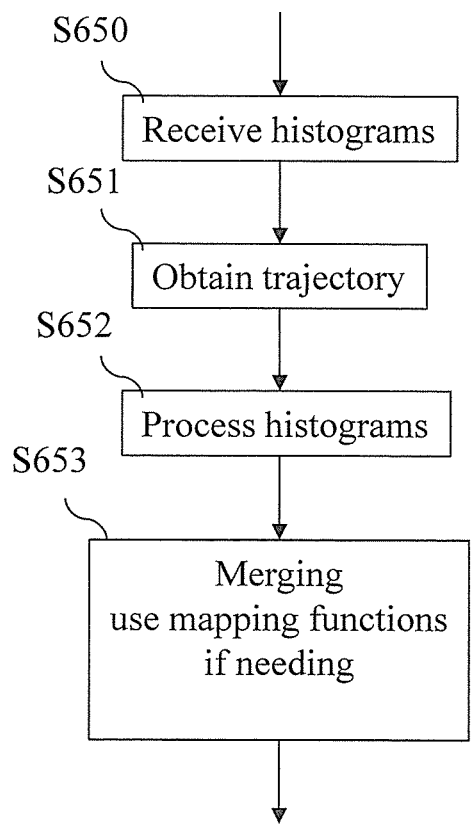

SYSTEM AND METHOD FOR QUANTIZING INTERFERENCE PROFILE

TECHNICAL FIELD

The present invention relates generally to a method and device for quantizing an interference profile for a wireless telecommunication system along a path that moving devices takes.

BACKGROUND ART

Cognitive radio is an intelligent radio that can be programmed and configured dynamically. The transceivers are designed to use the best wireless channels in their vicinity. Such radio transceivers automatically detect available channels in wireless spectrum, then accordingly change their transmission or reception parameters to allow more concurrent wireless communications in a given spectrum band at one location. This process is a form of dynamic spectrum management.

The cognitive radio main principle lies in sounding the radio environment in order to find the best resource for transmission. This is only possible if the radio environment doesn't change between the sounding and transmission period. When a telecommunication device moves, its radio environment changes quickly which does not allow using a cognitive radio approach.

Cognitive radio finds application in moving systems like for example communications-based train control (CBTC) system. Communications-based train control systems make use of the telecommunications between the train and track equipment for the traffic management and infrastructure control. By means of the CBTC systems, the exact position of a train may be known more accurately than with traditional signalling systems. This results in a more efficient and safer way to manage the railway traffic. Metros and other railway systems are able to improve headways while maintaining or even improving safety.

SUMMARY OF INVENTION

The present invention aims at improving the knowledge of interferences along a path that a takes moving device takes.

To that end, the present invention concerns a method for quantizing an interference profile for a wireless telecommunication system along a path that a moving device takes characterized in that the method comprises the steps of:
  obtaining, by a server, the location of the moving device along the path which corresponds to a measurement window,
  determining by using the location of the moving device, by the server, a format of feedback information that the moving device has to provide to the server after measurements performed in a measurement window,
  transferring, by the server, to the moving device, a message comprising information related to the determined format,
  receiving by the moving device the message,
  obtaining, by the moving device, during the measurement window, measurements related to interference in the wireless telecommunication system along the path,
  processing, by the moving device, the measurements performed during the measurement window in order to obtain feedback information in the format,
  transferring, by the moving device, feedback information to the server,
  receiving, by the server, the feedback information,
  converting, by the server, the feedback information in a format of a database related to interference profile,
  updating, by the server, the database with the converted feedback information.

The present invention concerns also a system for quantizing an interference profile for a wireless telecommunication system along a path that a moving device takes characterized in that the system comprises:
  means, comprised in a server, for obtaining the location of the moving device along the path which corresponds to a measurement window,
  means, comprised in the server, for determining, by using the location of the moving device, a format of feedback information that the moving device has to provide to the server after measurements performed in the measurement window,
  means, comprised in the server, for transferring to the moving device, a message comprising information related to the determined format,
  means, comprised in the moving device, for receiving the message,
  means, comprised in the moving device, for obtaining, during the measurement window, measurements related to interference in the wireless telecommunication system along the path,
  means, comprised in the moving device, for processing the measurements performed during the measurement window in order to obtain feedback information in the format,
  means, comprised in the moving device, for transferring feedback information to the server,
  receiving, by the server, the feedback information,
  means, comprised in the server, for converting the feedback information in a format of a database related to interference profile,
  means, comprised in the server, for updating the database with the converted feedback information.

Thus, by updating the database from the feedback information after each moving device travel, a position-based cognitive radio system can be efficiently applied and the invention allows to convert the measurements format into the database one.

Furthermore, by using a quantized version of the measurements, the volume of data to be transferred from the moving device to the server is limited.

According to a particular feature, the format indicates information representative of a quantization of the feedback information in the time and a quantization of the measurements and the measurements related to interference in the wireless telecommunication system along the path are processed in order to obtain for consecutive time periods of the measurement window at least a quantized interference related value from measurements performed within the time period and a weight representative of the number of measurements made within the time period index which have the same quantized interference-related value.

Thus, the probability density function of the interference related value can be estimated and fed back from the moving device to the server.

According to a particular feature, the information representative of the quantization in the time is related to time indexes uniformly spaced within the measurement time window and the information representative of the quantization of the interference related values is the same for each time index.

Thus, the format of feedback information is limited and the reconstruction of the feedback information at the server side is simple.

According to a particular feature, the information representative of the quantization in the time is related to time indexes uniformly spaced within the measurement time window and the information representative of the quantization of the interference related values varies for the time indexes.

Thus, the dynamic range of the quantization of the interference related value for each time index allows a better accuracy for the quantization.

According to a particular feature, the information representative of the quantization of the feedback information in the time and the quantization of the measurements is related to centroids coordinates determined by using a k-means algorithm.

Thus, a vector quantization is made possible which further provides additional accuracy for the quantization.

According to a particular feature, centroids coordinates are determined from a training sequence determined from a part of the database which corresponds to the measurement time window.

Thus, the centroids are chosen to further limit the inaccuracies due to the quantization steps, according to the a priori probability distribution of the interference related value, as stored in the database.

According to a particular feature, the converting of the feedback information is performed using a first mapping function that maps the time periods to locations of the moving device along the path and using a second mapping function that maps weights to a format of interference-related values stored in the database.

Thus, the feedback format is converted into the database format for applying the database update.

According to a particular feature, the converting of the feedback information is further performed from the results of the mapping functions and using a temporary database having the same size as the database, the databases being under the form of matrices and the matrix of the temporary database is updated using the mapped weights.

Thus, the database update can be done by conserving the normalization of the histograms stored in the database for each time index.

According to a particular feature, if feedback information further comprises for each weight centroid coordinates corresponding to the weight, the converting of the feedback information is further performed by superposing the matrix of the database to voronoi regions defined by the centroid and by applying a mask related to clusters positions in the temporary database and each mapped weight is used for updating the matrix of the temporary database according to the mask related to clusters positions in the temporary database.

Thus, the database update takes into account that the real probability density function of the interference related values is continuous and that a quantization, i.e., a discretization, of the measurements is performed for reducing the information exchange overhead. The correction provided by the mask is relevant to the statistical properties of the interference related values in the position domain.

According to a particular feature, the converting of the feedback information is further performed by applying a mask related to the mapped weights in the temporary database and each mapped weight is used for updating the matrix of the temporary database according to the mask related to the quantized interference-related values.

Thus, the database update takes into account that the real probability density function of the interference related values is continuous and that a quantization, i.e., a discretization, of the measurements is performed for reducing the information exchange overhead. The correction provided by the mask is relevant to the statistical properties of the interference related values in the interference values domain.

BRIEF DESCRIPTION OF DRAWINGS

The characteristics of the invention will emerge more clearly from a reading of the following description of example embodiments, the said description being produced with reference to the accompanying drawings, among which:

FIG. 1 represents an example of an architecture of a system for interference profile quantization for a wireless telecommunication system applied to a railway network;

FIG. 2 represents an example of the architecture of a measurement collecting device comprised in a moving device;

FIG. 3 represents an example of the architecture of a server in which the present invention is implemented;

FIG. 4 represents an example of an algorithm executed by the measurement collecting device according to the present invention;

FIG. 5 represents an example of an algorithm executed by the server in order to determine a format for receiving feedback information from a moving device according to the present invention;

FIG. 6a represents a first example of an algorithm executed by the server for updating a database according to the present invention;

FIG. 6b represents a second example of an algorithm executed by the server for updating a database according to the present invention.

DESCRIPTION OF EMBODIMENTS

FIG. 1 represents an example of an architecture of a system for interference profile quantization for a wireless telecommunication system applied to a railway network.

The system comprises a server Serv which is connected to a plurality of wayside radio units WRU in communication with trains through a wireless telecommunication system along a railroad RL.

When a moving device like a train TR moves, its radio environment changes quickly which makes it difficult to implement a cognitive radio approach.

According to the present invention, the moving device TR comprises a measurement collecting device ME.

Some interferers exist in areas covered by the way side radio units. More an interferer is close to the railroad and/or to the wayside radio unit, more the interferer impacts the wayside radio unit to train radio communication performance.

Interferers may be constant or may vary in time.

The server Serv maintains a database that is for example under the form of a matrix or table comprising values representative of clusters.

The database is representative of the random distribution of interference information like interference level, SINR, characteristic function of the interference. The database is defined for a given coverage area which is clusterized into small compact regions of space. For example, for the railroad, the position clusters are segments of the railroad. For each position cluster, the distribution of the random variable related to interference is stored in a discrete fashion, i.e., in the form of an histogram.

The train is assumed to make periodical or non-periodical measurements under request from the server Serv which indicates to the measurement collecting device ME the format of information related to measurements to be transferred to the server Serv. The measurement collecting device ME feeds back the information to the wayside radio units WRU which transfers it to the server Serv. The server Serv builds a fingerprint database of the interference in the area covered by each wayside radio units WRU and may transfer messages to moving devices in order to obtain feedback information in order to update and/or refine the database.

The database is decomposed into position clusters and interference-related values. The size of the position clusters stored in the database makes a trade-off between the accuracy of the description of the interference at each position within the cluster, the robustness of the interference description to noise and the amount of traffic needed to update the database.

Furthermore, as radio environment changes, the database has to be updated according to the changes of the radio environment in each position cluster. The robustness of one position cluster database improves with the number of measurements, which can vary according to the moving device speed or to the number of travels within each position cluster.

In the train TR, a measurement window is defined during which the train collects all the measurements made at several time indexes that may be defined by the server Serv, for example every millisecond and builds a discrete estimation of the probability density function of the random variable related to the interference level. The discrete estimation of the probability density function is defined in two dimensions: the time dimension and the interference-related value dimension. Each cluster of the discrete estimation of the probability density function comprises the number of measurements samples belonging to a region of the time/interference-related value plane. Then, the discrete estimation of the probability density function is fed back to the server Serv in a format indicated by the server Serv. The amount of data for defining the discrete estimation of the probability density function and its average periodicity of feedback define the overhead of feedback traffic.

According to the invention, the server Serv quantizes an interference profile for the wireless telecommunication system along a path that the moving device takes,
the server Serv obtains the location of the moving device along the path which corresponds to a measurement window,
the server Serv determines by using the location of the moving device, a format of feedback information that the moving device has to provide to the server after measurements performed in a measurement window,
the server Serv transfers to the moving device, a message comprising information related to the determined format,
the server Serv receives by the moving device the message,
the moving device, i.e. the train TR, obtains, during the measurement window, measurements related to interference in the wireless telecommunication system along the path,
the moving device processes the measurements performed during the measurement window in order to obtain feedback information in the format,
the moving device transfers feedback information to the server,
the server Serv receives the feedback information,
the server Serv converts the feedback information in a format of a database related to interference profile,
the server Serv updates the database with the converted feedback information.

FIG. 2 represents an example of the architecture of a measurement collecting device comprised in a moving device.

The measurement collecting device ME has, for example, an architecture based on components connected together by a bus 201 and a processor 200 controlled by a program as disclosed in FIG. 4.

The bus 201 links the processor 200 to a read only memory ROM 202, a random access memory RAM 203 and a wireless interface 205.

The memory 203 contains registers intended to receive variables and the instructions of the program related to the algorithm as disclosed in FIG. 4.

The processor 200 receives through the wireless interface 205 measurements relative to interference. The wireless interface 205 enables the transfer of data between the measurement collecting device ME and the wireless radio unit WRU. The WRU transfers the received data to the server Serv and forwards data received from the server Serv to the measurement collecting device if needed.

The read-only memory, or possibly a Flash memory 202, contains instructions of the program related to the algorithm as disclosed in FIG. 4, when the measurement collecting device ME is powered on, to the random access memory 203.

The measurement collecting device ME may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

In other words, the measurement collecting device ME includes circuitry, or a device including circuitry, causing the measurement collecting device ME to perform the program related to the algorithm as disclosed in FIG. 4.

FIG. 3 represents an example of the architecture of a server Serv.

The server Serv has, for example, an architecture based on components connected together by a bus 301 and a processor 300 controlled by a program as disclosed in FIG. 5, 6a or 6b.

The bus 301 links the processor 300 to a read only memory ROM 302, a random access memory RAM 303 and a network interface 306.

The memory 303 contains registers intended to receive variables and the instructions of the program related to the algorithm as disclosed in FIG. 5, 6a or 6b.

The processor 300 receives through the network interface 306 feedback information from measurement collecting devices ME that is forwarded by wireless radio units.

The read-only memory, or possibly a Flash memory 302, contains instructions of the program related to the algorithm as disclosed in FIG. 5, 6a or 6b, when the server Serv is powered on, to the random access memory 303.

The server Serv may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

In other words, the server Serv includes circuitry, or a device including circuitry, causing the server Serv to perform the program related to the algorithm as disclosed in FIG. 5, 6a or 6b.

FIG. 4 represents an example of an algorithm executed by the measurement collecting device according to the present invention.

The present algorithm is disclosed in an example wherein it is executed by the processor 200.

At step S400, the processor 200 checks if a message is received through the wireless interface 205. The message is transferred by the server Serv and comprises a feedback format indication which indicates the format of feedback information that the measurement entity ME has to provide to the server Serv after measurements performed in a measurement window.

The format of feedback information may be an histogram defined by a collection of triplets values (t,z,w) containing a time index t associated to a time period wherein plural measurements are performed if the points are uniformly spaced in time, a quantized interference-related value z like interference power in dB, SINR in dB. The feedback format indication defines the couples (t,z) also called centroids or center of the bins of the histogram. The third value w associated to each centroid (t,z) is computed at the measurement collecting device ME according to the measurements and a distance metric as described hereinafter.

The feedback format indication may indicate if feedback information are expressed in decibel, or in the linear domain.

The feedback format indication may indicate the periodicity with which a measurement window has to start and/or the moment at which a measurement window has to start and/or the duration of a measurement window.

For example, the time indexes t are uniformly spaced within the measurement time window and the quantized interference-related values z are uniformly spaced in a range of interference-related values and are the same for all the time periods forming a regular grid composed of centroids. The feedback format indication allows the grid to be constructed by the measurement collecting device ME. For example, the feedback format indication contains the maximum and minimum values of the time index t and the quantized interference related value z together with their respective number.

For example, the time indexes t are uniformly spaced within the measurement time window and the quantized interference-related values z are uniformly spaced in a range of interference-related values, the range of interference-related values being not the same for the time indexes t. This allows for adapting the dynamics of the interference related value quantization according to each period of time associated to each time index t. For example, the feedback format indication contains the maximum and minimum value of the time index together with the number of time indexes. For example, the feedback format indication contains the maximum and minimum values of the quantized interference related value z together with the number of quantized interference related value z for each time index t. For example, the feedback format indication contains all the centroids coordinates t(k), z(k) with k=1 to K. This allows to have non rectangular quantization cells, which can be used for vector quantization. For example, the centroids are determined by using a k-means algorithm by the server Serv as described hereinafter.

At step S401, the processor 200 checks if it is time to start a new measurement window.

For example, the message received at step S401 indicates when a measurement window has to start.

If it is time to start a new measurement window, the processor 200 moves to step S402. Otherwise, the processor 200 returns to step S401.

At step S402, the processor 200 obtains from the wireless interfaces measurements related to interference.

For example, measurements related to interference are performed every millisecond.

At next step S403, the processor 200 checks if the measurement window has to be interrupted.

If the measurement window has to be interrupted, the processor 200 returns to step S402. Otherwise, the processor 200 moves to step S404.

At step S404, the processor 200 processes the measurements performed during the measurement window.

The processor 200 processes the measurements performed during the measurement window according to the feedback format indication received at step S400 and a distance metric.

The processor 200 may compute if needed the coordinates t(k), z(k) with k=1 to K of each centroid from the feedback format indication.

Thus, the triplets (t,z,w) are given from the centroid coordinates t(k), z(k) and by computing the weight w(k) of each associated quantization cell of the centroid t(k), z(k), where k is the index of the feedback triplets (t,z,w) with k=1 to K. The computation of the centroid weight w(k) is done online. The weight of a centroid is incremented when a measurement has a closer distance metric with the centroid center than with any other centroid center. Usually, the euclidean distance is used.

At next step S405, the processor 200 commands the transfer of triplets, or preferably only the weights w(k), of the formed histograms through the wireless interface 205 to the wireless radio unit WRU which forwards the formed triplets or weights to the server Serv.

As the server Serv knows the feedback format indication, the server can recompute the list of centroid coordinates t(k), z(k) and associate each centroid (t(k), z(k)) with the received weight w(k) in order to form the triplet (t(k), z(k),w(k)).

FIG. 5 represents an example of an algorithm executed by the server in order to determine a format for receiving feedback information from a moving device according to the present invention.

The present algorithm is disclosed in an example wherein it is executed by the processor 300.

At step S500, the processor 300 checks if a new measurement window is needed. For example, as interferences change in time, the data base needs to be updated periodically or following a previous measurement window, wherein interference changes have been detected and need to be confirmed.

If it is time to start a new measurement window, the processor 300 moves to step S501. Otherwise, the processor 200 returns to step S500.

At step S501, the processor 300 obtains the trajectory of the train in which the measurement collecting device ME is included, or a prediction of such trajectory. The trajectory of the train comprises the path of the train in combination of the corresponding theoretical speeds of the train. Thus, the server Serv is able to perform a mapping between time and position, and more particularly between time indexes and positions, the time indexes being defined by a discrete time basis, such as the one determined for the measurements.

At next step S502, the processor 300 determines a feedback format indication for the information that the server Serv will receive in response.

The feedback format indication is for example determined according to the database stored in the server Serv, which contains information relative to the interference environment with respect to the position. For example, measurements need to be refined or need to be more accurate than the previous ones. Thus, the server Serv extracts the portion of the database according to the positions of the train extracted from the train trajectory and the measurement time window.

The format may be an histogram of a collection of triplets values (t,z,w) containing a time period index t, the quantized interference-related value z like interference power in dB, SINR in dB.

For example, time indexes t are uniformly spaced within the measurement time window and the quantized interference-related values z are uniformly spaced in a range of interference-related values. Still, the maximal and minimal values of the time indexes and the quantized interference-related values z must be determined. For the time indexes, the time periods corresponding to the time indexes are the same between the beginning and end of the measurement window. For the quantized interference-related values z, the server Serv can extract the minimal and maximal values previously experienced from the database and may use them for calibrating the new maximal and minimal values to be used.

For example, the time indexes t are uniformly spaced within the measurement time window and the quantized interference-related values z are uniformly spaced in a range of interference-related values, the range of interference-related values being not the same for the time indexes t. For the time indexes, the time periods corresponding to the time indexes are the same between the beginning and end of the measurement window. Still, the maximal and minimal values of the quantized interference-related values z must be determined for each time period associated to each time index t.

For the maximal and minimal values of the quantized interference-related values z, the server can extract for each time index t, the minimal and maximal value previously experienced from the database among the positions according to the time period associated to said time index and the train trajectory.

For example, the feedback format indication contains all the centroids coordinates t(k), z(k) with k=1 to K. This allows to have non rectangular quantization cells for the time and for the quantized interference-related values, which can be used for vector quantization. For example, the centroids are determined by using a k-means algorithm by the server Serv as described hereinafter.

Centroids are computed by using a vector quantizer, such as the k-means algorithm.

The k-means algorithm needs a training sequence. The server Serv extracts the position clusters of the database corresponding to the measurement time window and uses it for generating the training sequence.

The server Serv computes the training sequence with a predetermined number of samples of the extracted position clusters of the database. The server Serv then computes a number of samples per position cluster of the database proportional to the amount of time spent in each position cluster according to the train trajectory and the measurement time window.

The server Serv then generates, for each position of the extracted position clusters, the computed number of samples per position of the extracted position clusters. For each position cluster of the database, the database contains an histogram composed of bins of values, and a training sequence of a computed number of samples can be generated in order to be representative of said histogram. This can be classically done by generating a cumulative histogram for each position cluster and each bin weight, where the bin center is associated to an interference-related value, being given by the weights of the bins from the first to current bin. Then, a random number is uniformly generated between 0 and 1. The bin of the cumulative histogram having the bin weight the closest to said generated random number is selected as a sample value, and so on.

Finally all the samples generated for all the positions of the extracted clusters are appended into a training sequence that fits to the probability density function stored into the database, and to the train trajectory. Thus, if the train spends more time in a position, more samples will be generated for this position, and each position random radio environment will be accurately modelled. Then, the centroids t(k), z(k) are determined from the training sequence, for example by using a k-means algorithm.

The k-means algorithm determines t(k) and z(k) as coordinates of a centroid.

The feedback format indication may indicate if feedback information are expressed in decibel, or in the linear domain.

The feedback format indication may indicate the periodicity a measurement window has to starts and/or the moment at which a measurement window has to start and/or the duration of a measurement window.

At next step S503, the processor 300 commands the transfer, through the wireless interface 305 of a message. The message comprises feedback format indication that allows the measurement entity ME for providing at least the weights w to the server Serv after measurements performed in a measurement window, as previously described.

The feedback format may be an histogram defined by a collection of triplets values (t,z,w) containing a time index t associated to a time period wherein plural measurements are performed if the points are uniformly spaced in time, a quantized interference-related value z like interference power in dB, SINR in dB. The feedback format indication defines the couples (t,z) also called centroids or center of the bins of the histogram. The third value w associated to each centroid (t,z) is computed at the measurement collecting device ME according to the measurements and a distance metric as described hereinafter.

The feedback format indication may indicate if feedback information are expressed in decibel, or in the linear domain.

The feedback format indication may indicate the periodicity with which a measurement window has to start and/or the moment at which a measurement window has to start and/or the duration of a measurement window.

For example, the time indexes t are uniformly spaced within the measurement time window and the quantized interference-related values z are uniformly spaced in a range of interference-related values and are the same for all the time periods forming a regular grid composed of centroids. The feedback format indication allows the grid to be defined by the measurement collecting device ME. For example, the feedback format indication contains the maximum and minimum values of the time index t and the quantized interference related value z together with their respective number.

For example, the time indexes t are uniformly spaced within the measurement time window and the quantized interference-related values z are uniformly spaced in a range of interference-related values, the range of interference-related values being not the same for the time indexes t. This allows adapting the dynamics of the interference related value quantization according to each period of time associated to each time index t. For example, the feedback format indication contains the maximum and minimum value of the time index together with the number of time indexes. For example, the feedback format indication contains the maximum and minimum values of the quantized interference related value z together with the number of quantized interference related value z for each time index. For example, the feedback format indication contains all the centroids coordinates t(k), z(k) with k=1 to K. This allows to have non rectangular quantization cells, which can be used for vector quantization.

FIG. 6a represents a first example of an algorithm executed by the server for updating a database according to the present invention.

The present algorithm is disclosed in an example wherein it is executed by the processor 300.

At step S600, the processor 300 receives through the network interface 306 triplets of the histograms formed by a measurement collecting device ME or the weights w if the time period and the quantization are constant.

At next step S601, the processor 300 obtains the trajectory of the train in which the measurement collecting device ME is included.

The database stored in the server Serv comprises a collection of discrete values relative to the random distribution of interference information. The database is for example under the form of at least one matrix DB, each matrix being related to a region covered by the system. The matrix is for example a (I*J) matrix. Each stored value in the bin DB(i,j) is associated to a position x(i) and a value y(j), where x is the vector of positions quantizing the possible positions of the train within the region and y is the vector of values quantizing the range of interference-related values. The conversion of the histograms formed by a measurement collecting device ME into a format corresponding to the database's one depends on the histogram format.

At next step S602, the processor 300 processes the received histograms or weights w if the time period and the quantization are constant.

The processor 300 determines position or positions in the database, or in other words bins of the matrix of the database, which corresponds or correspond to each triplet or weight.

The processor 300 uses a mapping function TP( ) that corresponds to the trajectory of the train and allows to map the time period index to a position along the railway RL i.e. to a position cluster.

For a given feedback index k with values (t(k),z(k),w(k)) the processor 300 finds the index i'(k) such that such |TP(t(k))−x(i'(k))| is minimized.

Thus, i'(k) is the row index of the position cluster in the database corresponding to the position of the measurement collecting device ME for the k-th measurement at time t(k) in the measurement window.

The processor 300 further uses a mapping function ML( ) that allows to map the value stored in the database to the quantized interference-related value z. The mapping function ML( ) is preferably bijective. For example, one can feedback a SINR level in dB and store it in linear.

Then, for a given feedback index k with values (t(k),z(k),w(k)) we can find the column index j'(k) such that such |ML(z(k))−y(j'(k))| is minimized. Thus, j'(k) is the column index of the database corresponding to the transformation of the k-th quantized interference-related value z into a value relative to the random distribution of interference information and quantized according to the database format.

The processor 300 further uses a temporary database DBT having the same size as the database DB, first initialized with zero values.

More precisely, the processor 300 converts the received quantized interference-related value z and fills the bins of the temporary database DBT.

The processor 300 increments each bin value DBT(i'(k), j'(k)) by w(k).

If a k-means algorithm is used by the measurement collecting device ME that determines a codebook of centroids associated to non-regular quantization bins, the processor 300 superimposes the grid of the matrix of the temporary database DBT or of the matrix of the database DB as they have the same size to the voronoi regions defined by the centroid.

A direct quantization of the received histogram with the database DB bins may associate some measurements via their centroid to the wrong position x(i'(k)) and a value y(j'(k)).

The processor 300 applies then a mask in the conversion process, i.e. by not only setting each bin value DBT(i'(k),j'(k)) by w(k) but by incrementing all the bins values DBT(i,j) by w(k)*M(i,j,TP(t(k)),ML(z(k))) values where i varies from 1 to I and j from 1 to J. For example M(i,j,TP(t(k)),ML(z(k)))=1 if the centroid (x(i),y(j)) is the closest of the point (TP(t(k)),ML(z(k))) according to the distance metric, for example the euclidean distance and M(i,j,TP(t(k)),ML(z(k)))=0 otherwise. In another option, M(i,j,TP(t(k)),ML(z(k)))=1/n, where n is the sum of the M(i,j,TP(t(k)),ML(z(k))) values for all i and j.

In another example, an independent mask is applied in the position and values dimensions, such that M(i,j,TP(t(k)),ML(z(k)))=Mp(i,TP(t(k)))+Mv(j,ML(z(k))) when the database DB relates to interference information expressed in decibel, or M(i,j,TP(t(k)),ML(z(k)))=Mp(i,TP(t(k)))*Mv(j,ML(z(k))) when the database DB relates to interference information in the linear domain.

Mp( ) is a mask related to positions in the temporary database DBT and Mv is a mask applied to the weights in the temporary database DBT.

It has to be noted here that if the received quantized interference-related value is expressed in dB in a system wherein fading occurs, the distribution of the fading in dB is non symmetric.

If an interference is received with an average power Pi (dB), measurements according to the distribution of the fading in dB are shifted by Pi dB.

For example, a measurement attenuated by −20 dB is less probable than one at 0 dB, and its weight in the clustering computation should be less. The metric for building the clusters is then associated to probability density function of the fading.

In this case, one can choose Mv(j,ML(z(k)))=pv(|ML(z(k)))−y(j)|), where pv is the probability density function of the fading in dB, e.g., $$pv(a) = \frac{\log(10)}{10} 10^{a/10} e^{-10a/10}$$

Equivalently, the mask in the position dimension can follow a typical path loss model, which leads to $Mp(i,TP(t(k)))=pp(|TP(t(k))-x(i)|)$ and $$pp(b)=\alpha+\beta \log 10(|b|)$$

where $\alpha$ and $\beta$ are parameters that can be tuned according to the environment.

In another example, the parameters $\alpha(i)$ and $\beta(i)$ also depend on the location along the railway, which leads to $Mp(i,TP(t(k)))=pp(i,|TP(t(k))-x(i)|)$ and $$pp(i,b)=\alpha(i)+\beta(i)\log 10(|b|)$$

At next step S603, the processor 300 merges the temporary database DBT to the database DB.

In other words, the present invention locates the bin of the database DB associated to the position and the value stored in the database DBT related to the k-th measurement, and combines the weights comprised in the bins of the temporary database DBT of measurements falling in the same bin of the database DB together.

The processor 300 merges the temporary database DBT with the database DB, for example by using a weighted averaging of the discrete estimation of the probability density function. First, the processor 300 defines N(i) as the sum of the weights of the i-th row of the database DB.

For each row i of the database matrix DB and of the temporary database DBT, the processor 300 performs the following computation:
  computes N'(i) as the sum of the weight DBT(i,j) of the i-th row of the temporary database,
    sets for each row i, the value DB(i,j) to (DB(i,j)*N(i)+DBT(i,j))/(N(i)+N'(i)),
  updates N(i) to N(i)+N'(i).
Alternatively, the processor 300 performs the following computation:
  normalizes the temporary database DBT in a normalized temporary database NDBT such that the sum of its i-th row is equal to one,
  sets for each row i, the value DB(i,j) to (DB(i,j)*N(i)+NDBT(i,j))/(N(i)+1),
  updates N(i) to N(i)+1.
Alternatively, the processor 300 performs the following computation:
  normalizes the temporary database DBT in a normalized temporary database NDBT such that the sum of its i-th row is equal to one,
  sets for each row i, the value DB(i,j) to DB(i,j)+µ*(NDBT(i,j)-DBT(i,j)) (where µ<1).

FIG. 6b represents a second example of an algorithm executed by the server for updating a database according to the present invention.

At step S650, the processor 300 receives through the network interface 306 histograms formed by a measurement collecting device ME or the weights w if the time period and the quantization are constant.

At next step S651, the processor 300 obtains the train trajectory of the train in which the measurement collecting device ME is included.

The database stored in the server Serv comprises a collection of discrete values relative to the random distribution of interference information. The database is for example under the form of at least one matrix DB, each matrix being related to a region covered by the system. The matrix is for example a (I*J) matrix. Each stored value DB(i,j) is associated to a position x(i) and a value y(j), where x is the vector of positions quantizing the possible positions of the train within the region and y is the vector of values quantizing the range of interference-related values. The conversion of the histograms formed by a measurement collecting device ME into a format corresponding to the database's one depends on the histogram format.

At next step S652, the processor 300 processes the received histograms or weights w if the time period and the quantization are constant.

The processor 300 determines position or positions in the database, or in order words bins of the matrix of the database, which corresponds or correspond to each triplet or weight.

The processor 300 uses a mapping function TP( ) that corresponds to the trajectory of the train and allows to map the time period index to a position along the railway RL i.e. a position cluster.

For a given feedback index k with values (t(k),z(k),w(k)) the processor 300 finds the index i'(k) such that such $|TP(t(k))-x(i'(k))|$ is minimized.

Thus, i'(k) is the row index of the position in the database corresponding to the position of the measurement collecting device ME for the k-th measurement at time t(k) in the measurement window.

The processor 300 further uses a mapping function ML( ) that allows to map the value stored in the database to the quantized interference-related value z. The mapping function ML( ) is preferably bijective. For example, one can feedback a SINR level in dB and store it in linear.

Then, for a given feedback index k with values (t(k),z(k),w(k)) we can find the column index j'(k) or position cluster such that such $|ML(z(k))-y(j'(k))|$ is minimized. Thus, j'(k) is the column index in the database corresponding to the transformation of the k-th quantized interference-related value z into a value relative to the random distribution of interference information and quantized according to the database format.

The processor 300 further uses a temporary database DBT having the same size as the database DB, first initialized with zero values.

More precisely, the processor 300 converts the received quantized interference-related value z and fills the bins of the temporary database DBT.

The processor 300 increments each bin value DBT(i'(k), j'(k)) by w(k).

At next step S603, the processor 300 merges the temporary database DBT to the database DB.

In other words, the present invention locates the bins of the database DB associated to the position and the value stored in the database DBT related to the k-th measurement, and combines the weights comprised in the bins of the temporary database DBT of measurements falling in the same cluster of the database DB together.

The processor 300 merges the temporary database DBT with the database DB, for example by using a weighted averaging of the discrete estimation of the probability density function. First, the processor 300 defines N(i) as the sum of the weights of the i-th row of the database DB.

For each row i of the database matrix DB and of the temporary database DBT, the processor 300 performs the following computation:
  computes N'(i) as the sum of the weight DBT(i,j) of the i-th row of the temporary database,
    sets for each row i, the value DB(i,j) to (DB(i,j)*N(i)+DBT(i,j))/(N(i)+N'(i))
  updates N(i) to N(i)+N'(i).

Alternatively, the processor 300 performs the following computation:
- normalizes the temporary database DBT in a normalized temporary database NDBT such that the sum of its i-th row is equal to one,
- sets for each row i, the value DB(i,j) to (DB(i,j)*N(i)+ NDBT(i,j))/(N(i)+1),
- updates N(i) to N(i)+1.

Alternatively, the processor 300 performs the following computation:
- normalizes the temporary database DBT in a normalized temporary database NDBT such that the sum of its i-th row is equal to one,
- sets for each row i, the value DB(i,j) to DB(i,j)+μ*(NDBT(i,j)−DBT(i,j)) (where μ<1).

If a k-means algorithm is used by the measurement collecting device ME that determines a codebook of centroids associated to non-regular quantization bins, the processor 300 superimposes the bins of the matrix of the database DB to the voronoi regions defined by the centroid.

A direct quantization of the received histogram with the database DB may associate some measurements via their centroid to the wrong position x(i) and a value y(j).

The processor 300 applies then a mask in the merging process, i.e. by not only updating the value DB(i,j) with DBT(i,j) but by incrementing all the bins values DB(i,j) by DBT(i'',j'')*M''(i'',i,j'',j) values where i'' and j'' denote the indexes of the temporary database DBT. For example M''(i'',i,j'',j)=1 if the centroid (x(i),y(j)) is the closest of the point (x(i'),y(j')) according to the distance metric, for example the euclidean distance and M''(i'',i,j'',j)=0 otherwise. In another option, M''(i'',i,j'',j)=1/a, where a is the sum of the M''(i'',i,j'',j) values for all i'' and j''.

In another example, an independent mask is applied in the position and values dimensions, such that M''(i'',i,j'',j)=Mp''(i'',i)+Mv''(j'',j) when the database DB relates to interference information expressed in decibel, or M''(i'',i,j'',j)=Mp''(i'',i)× Mv''(j'',j) when the database DB relates to interference information in the linear domain.

Mp''( ) is a mask related to positions clusters in the temporary database DBT and Mv is a mask applied to the weights in the temporary database DBT.

It has to be noted here that if the received quantized interference-related value is expressed in dB in a system wherein fading occurs, the distribution of the fading in dB is non symmetric.

If an interference is received with an average power Pi (dB), measurements according to the distribution of the fading in dB are shifted by Pi dB.

For example, a measurement attenuated by −20 dB is less probable than one at 0 dB, and its weight in the bin computation should be less. The metric for building the bins is then associated to probability density function of the fading.

In this case one can choose Mv''(j'',j)=pv(|y(j'')−y(j)|), where pv is the probability density function of the fading in dB, e.g., $$pv(a) = \frac{\log(10)}{10} 10^{a/10} e^{-10a/10}$$

Equivalently, the mask in the position dimension can follow a typical path loss model, which leads to Mp''(i'',i)= pp(|x(i'')−x(i)|) and $$pp(b)=\alpha+\beta \log 10(|b|)$$

where α and β are parameters that can be tuned according to the environment.

In another example, the parameters α(i) and β(i) also depend on the location along the railway, which leads to Mp''(i'',i)=pp(i,|x(i'')−x(i)|) and $$pp(i,b)=\alpha(i)+\beta(i)\log 10(|b|)$$

Naturally, many modifications can be made to the embodiments of the invention described above without departing from the scope of the present invention.

The invention claimed is:

1. A method for quantizing an interference profile for a wireless telecommunication system along a path that a moving device takes, the method comprising:
   - obtaining, by a server, the location of the moving device along the path which corresponds to a measurement window,
   - determining by using the location of the moving device, by the server, a format of feedback information that the moving device has to provide to the server after measurements performed in a measurement window, the format indicating information representative of a quantization of the feedback information in a time and a quantization of the measurements,
   - transferring, by the server, to the moving device, a message comprising information related to the determined format,
   - receiving by the moving device the message,
   - obtaining, by the moving device, during the measurement window, measurements related to interference in the wireless telecommunication system along the path,
   - processing, by the moving device, the measurement performed during the measurement window in order to obtain feedback information in the format, the measurements related to interference in the wireless telecommunication system along the path being processed in order to obtain for consecutive time periods of the measurement window at least a quantized interference related value from measurements performed within the time period and a weight representative of the number of measurements made within the time period index which have the same quantized interference-related value, the feedback information is in a format of a histogram defined by a collection of triplet values representing the time period index, the quantized interference-related value, and the weight;
   - transferring, by the moving device, feedback information to the server,
   - receiving, by the server, the feedback information,
   - converting, by the server, the feedback information in a format of a database related to interference profile, and
   - updating, by the server, the database with the converted feedback information.

2. A method according to claim 1, wherein the information representative of the quantization in time is related to time indexes uniformly spaced within the measurement time window and the information representative of the quantization of the interferences related values is the same for each time index.

3. A method according to claim 1, wherein the information representative of the quantization in time is related to time indexes uniformly spaced within the measurement time window and the information representative of the quantization of the interferences related values varies for the time indexes.

4. A method according to claim 1, wherein the information representative of the quantization of the feedback information in the time and the quantization of the measurements is related to centroids coordinates determined by using a k-means algorithm.

5. A method according to claim 4, wherein centroids coordinates are determined from training sequence determined from a part of the database which corresponds to the measurement time window.

6. A method according to claim 1, wherein the converting of the feedback information is performed using a first mapping function that maps the time periods to locations of the moving device along the path and using a second mapping function that maps weights to a format of interference-related values stored in the database.

7. A method according to claim 6, wherein the converting of the feedback information is further performed from the results of the mapping functions and using a temporary database having the same size as the database, the databases being under the form of matrices and the matrix of the temporary database is updated using the mapped weights.

8. A method according to claim 5, wherein if feedback information further comprises for each weight centroid coordinates corresponding to the weight, the converting of the feedback information is further performed by superposing the matrix of the database to voronoi regions defined by the centroid and by applying a mask related to clusters positions in the temporary database and each mapped weight is used for updating the matrix of the temporary database according to the mask related to dusters positions in the temporary database.

9. A method according to claim 5, wherein the converting of the feedback information is further performed by applying a mask related to the mapped weights in the temporary database and each mapped weight is used for updating the matrix of the temporary database according to the mask related to the quantized interference-related values.

10. A system for quantizing an interference profile for a wireless telecommunication system along a path that a moving device takes, the system comprising:
   a first processor and a first input output interface disposed in a server; and
   a second processor and a second input output interface disposed in the moving device; wherein the first processor:
   obtains the location of the moving device along the path which corresponds to the measurement window; and
   determines, by using the location of the moving device, a format of feedback information that the moving device has to provide to the server after measurements performed in the measurement window, the format indicating information representative of a quantization of the feedback information in a time and a quantization of the measurements,
the first input output interface:
transfers to the moving device, a message comprising information related to the determined format,
the second input output interface:
receives the message,
the second processor:
obtains, during the measurement window, measurements related to interference in the wireless telecommunication system along the path;
processes the measurements performed during the measurement window in order to obtain feedback information in the format, the measurements related to interference in the wireless telecommunication system along the path being processed in order to obtain for consecutive time periods of the measurement window at least a quantized interference related value from measurements performed within the time period and a weight representative of the number of measurements made within the time period index which have the same quantized interference-related value; the feedback information is in a format of a histogram defined by a collection of triplet values representing the time period index, the quantized interference-related value, and the weight; and
the second input output interface:
transfers feedback information to the server,
first input output interface:
receives the feedback information; and
the first processor:
converts the feedback information in a format of a database related to interference profile; and
update the database with the converted feedback information.

* * * * *